Aug. 16, 1955 HIDEO TATIBANA 2,715,521

AIR WASHER AND CONDITIONER

Filed Aug. 20, 1952

INVENTOR.
HIDEO TATIBANA
BY
Haseltine, Lake & Co.
AGENTS

United States Patent Office 2,715,521
Patented Aug. 16, 1955

2,715,521

AIR WASHER AND CONDITIONER

Hideo Tatibana, Tokyo, Japan

Application August 20, 1952, Serial No. 305,401

Claims priority, application Japan June 13, 1952

3 Claims. (Cl. 261—18)

The present invention relates to an apparatus which cleans and at the same time adjusts the temperature and humidity of air, comprising a container of water and/or other liquids maintained at a required temperature, provided at its upper portion with a discharging outlet of air to be blown out, some cylindrical tubes having a portion of reduced diameter mounted vertically in parallel in said container, an air nozzle projecting towards the center of the entrance of said portion of each cylindrical tube from the bottom respectively and communicating with a pipe outside of the container to introduce air under pressure, and screens arranged in three levels to divide the portion above that of reduced diameter of each cylindrical tube into two chambers, an upper condensing chamber filled with packings to promote the mutual contact between air and liquid and a lower mixing spray chamber containing a plurality of small balls of materials such as glass in such an extent that the said balls may be suspended in the air injected and be able to be moved freely by said air, and the purpose of the present invention is to clean air as well as to adjust the temperature and humidity thereof very economically and effectively by means of an apparatus which is simple and compact in size but still is effective in treating a great amount of air continuously for a long duration employing a relatively small amount of liquid without overheating or cooling excessively.

For the better understanding of present invention, the details will now be explained with reference to the accompanied drawings in which.

Figure 1:
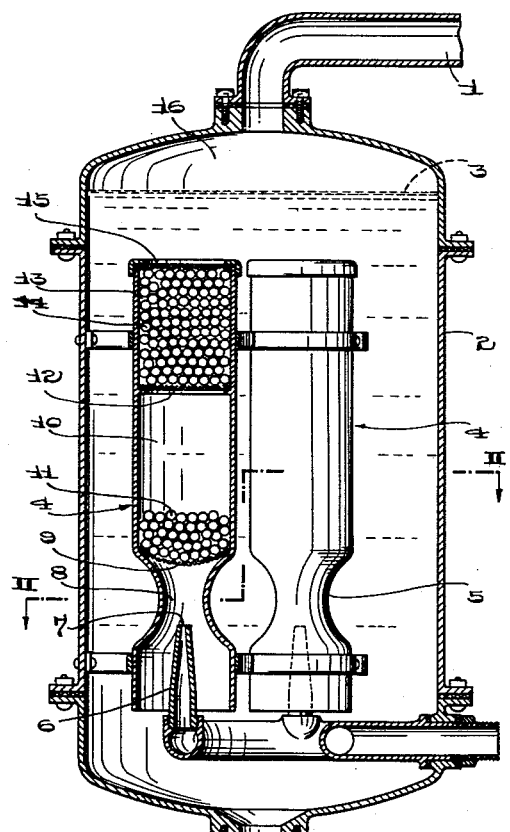
Fig. 1 is an elevation in section of the apparatus of the present invention.
Figure 2:
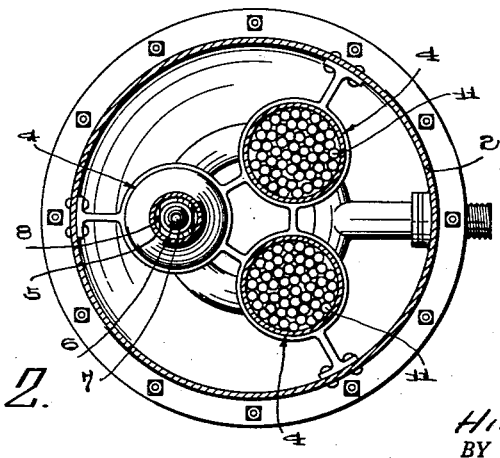
Fig. 2 is a cross section of the same taken along the line II—II of Fig. 1.

In the drawings, a suitable liquid 3 such as water or a liquid of high heat capacity, a liquid of low surface tension or a liquid having adsorptive property, an involatile liquid, or a liquid having disinfective property, or a mixture thereof is maintained in a container 2 which is provided with a discharging outlet 1 of air to be blown out, and is maintained at a required temperature. Some cylindrical tubes 4 are arranged vertically in the container to be immersed into said liquid 3, each cylindrical tube having a portion of reduced diameter 5 into which air is blown through a mouth 7 of air injecting nozzle 6 respectively.

When air under pressure is blown into said portion through the nozzle 6 by means of a pump or any other suitable equipment (not shown) liquid is suctioned as spray with high velocity into the cylindrical tube passing through the clearance 8 existing between the nozzle 6 and the wall of the entrance of the narrowed portion of the cylindrical tube 5 and a screen 9 at the bottom of the mixing spray chamber 10 due to the negative or reduced pressure around the mouth 7 of the nozzle caused by the air jet passing through the mouth.

The mixing spray chamber 10 is defined by two screens of fine mesh, the lower mesh 9 and the upper mesh 12 which prevent the free passage of liquid, but the liquid is pushed upwardly and the chamber 10 may be maintained substantially free of liquid excepting liquid particles suspended in the air. Thus the air injected from the nozzle 6 may effect the action of an ejector in the chamber 10. Moreover the wet small balls 11, not being prevented by liquid, may move freely and vigorously in every direction exhibiting a condition of bubbling, causing good mutual contact between particles in the chamber in a moment to absorb and remove dusts and microorganisms in suspension into the liquid, while effecting heat exchange between air and liquid to bring the temperature of the air nearly to that of the liquid. Then the air containing liquid particles in suspension may be pushed upwardly through the screen 12 of fine mesh with a high speed into the condensing chamber 13 and these liquid particles in suspension may be condensed gradually therein to be removed from the air, while they are passed through the clearance between packings 14 filled therein colliding against each other many times and taking zig-zag passages, thus causing intimate contact between air and liquid.

The air and the liquid then pass through the screen 15 of fine mesh at the top of the chamber and the air passes through the liquid layer 3 above the chamber as bubbles into the air layer at the top of the container 16, having been made into cleaned air with a temperature adjusted nearly to that of liquid to go out through the discharging pipe 1.

In this apparatus, more than one liquid, such as, water and oil which are immiscible with each other and have different specific gravities tending to make layers of different liquids individually, may be used so that, when the air and water particles exit through the screen 15 of fine mesh, such particles pass into the uppermost layer of oil and the water particles, being of greater specific gravity than the oil, tend to sink, while the air rises through the oil to escape at the upper surface for removal through the exhaust duct 1. Thus, the use of two immiscible liquids, such as, oil and water, promotes the condensation or separation of the water from the cooled and washed air to decrease the humidity of the latter, and also to decrease the consumption of water.

According to the present invention, air of great volume can be treated in a short time to have air thoroughly washed and having a temperature close to that of the liquid, since the air injected from the nozzle entrains the atomized liquid of required temperature and impacts against small wet balls having the temperature as required to move vigorously in every direction causing intimate contact between air and the liquid particles and small balls. When the air passes through the condensing chamber 13, the liquid particles may be aggregated and removed from the air, and since the air not only moves vigorously together with the liquid particles which are still small in size, but also its passage is changed from moment to moment all over the region, and when the liquid in the cylindrical tubes 4 is being carried on upwardly by the stream of air and the liquid outside of the column is being suctioned from the bottom of the column. Thus the convection currents of the liquid in the container 2 may be set up as a whole, leaving no place where the liquid may rest at standstill. Accordingly moreover due to the repeated passage of air as small bubbles accompanied by fine particles of the liquid, the effect of washing may be secured and remarkably promoted, making it possible to use the apparatus for a long time continuously, not decreasing the efficiency in cleaning.

It is also to be noted that there is no need of excessive heating or cooling of the liquid, because substantially same temperature may be maintained causing no local different temperature throughout the liquid and the air contacts the liquid intimately and directly to obtain necessarily a temperature close to that of the liquid promptly.

Thus the apparatus of the present invention may be utilized in many purposes. For instance, it may be utilized for raising the temperature and humidity in winter for warming the room of a house and conveyance such as motor-car, air-craft, passenger-car or the like. It may also be used to lower the temperature and humidity in summer to maintain the air in a room in the condition of clean and comfortable by a simple and economical means. It may further be used for removing the dust from the air in the places such as coal and mineral mines to afford clean air to the workers in order to safeguard their health in addition to increase the efficiency.

It should be understood that the present invention is not limited by the embodiment as explained with reference to the drawings, since it is possible to make modifications and alterations of the embodiment within the scope and the spirit of the present invention.

For example, the screen 9 may be eliminated by using a relatively small diameter at the narrowed portion of cylindrical tube 5 and at the same time using small balls 11 having a comparatively large size within the limit not hindering the vigorous movement of said balls by the air passing through the chamber 10.

Having thus described my invention, what I claim as novel and wish to secure by Letters Patent is as follows:

1. Apparatus for washing air and adjusting the temperature as well as humidity thereof, comprising a container having liquid therein maintained at a required temperature, provided with a discharging outlet for air to be blown out at its upper portion, a plurality of cylindrical tubes each having a portion of reduced diameter, said tubes being mounted vertically parallel to each other within said container, an air nozzle projecting towards the center of the entrance of the reduced diameter portion of each cylindrical tube from the bottom of the latter and communicating with a pipe extending to the outside of the container for supplying air under pressure, and fine mesh screens arranged in each of said tubes at three levels to divide the portion of the related tube above the reduced diameter portion thereof into, an upper condensing chamber filled with packings to promote mutual contact between air and liquid and a lower mixing spray chamber loosely containing a plurality of small glass balls, the air ejected from said nozzles acting with sufficient force to drive the liquid from the related lower mixing spray chambers and to introduce air jets containing spray into the mixing spray chambers in which said glass balls are suspended and move freely to ensure intimate contact of the spray laden air with said balls.

2. Apparatus for washing air and for adjusting the temperature and humidity thereof; comprising a container having therein water and a second liquid of lower specific gravity which is immiscible with water so that said second liquid forms a layer adjacent the top of said container, said water and second liquid being maintained at the required temperature, said container having a discharge outlet at its upper end for removing treated air, a plurality of parallel vertical tubes within said container and each having a reduced diameter lower portion, means for supplying air under pressure to said container and terminating in nozzles extending upwardly at the centers of said reduced diameter portions, fine mesh screens in said tubes and arranged at three levels in the latter to divide the portion of each tube above said reduced diameter portion into an upper condensing chamber and a lower mixing spray chamber, packings filling said condensing chamber to promote the mutual contact between air and liquid therein, and small glass balls loosely disposed in said mixing spray chamber and adapted to be suspended, and move freely about in the jet of air and atomized water introduced therein by the related nozzle, so that water and air discharged from the upper ends of said tubes pass into said layer of the second liquid and the latter ensures the removal of the water from the air.

3. Apparatus according to claim 2; wherein said second liquid is oil.

References Cited in the file of this patent

UNITED STATES PATENTS

| Number | Name | Date |
|---|---|---|
| 1,582,899 | Cassidy | May 4, 1926 |
| 1,916,551 | Bartlett | July 4, 1933 |
| 2,253,261 | Bacon | Aug. 19, 1941 |
| 2,289,953 | Aldridge | July 14, 1942 |
| 2,301,601 | Wittwer et al. | Nov. 10, 1942 |
| 2,501,114 | Whaley | Mar. 21, 1950 |